US005809087A

United States Patent [19]
Ashe et al.

[11] Patent Number: 5,809,087
[45] Date of Patent: Sep. 15, 1998

[54] COHERENT DETECTION ARCHITECTURE FOR REMOTE CALIBRATION OF COHERENT SYSTEMS

[75] Inventors: Jeffrey Michael Ashe, Gloversville; Robert Leland Nevin; Seth David Silverstein, both of Schenectady, all of N.Y.

[73] Assignee: General Electric Company, Schenectady, N.Y.

[21] Appl. No.: 738,195

[22] Filed: Oct. 25, 1996

[51] Int. Cl.[6] .............................. H03D 1/00; G01S 7/40; H01Q 3/00

[52] U.S. Cl. .......................... 375/340; 342/165; 342/174; 342/360

[58] Field of Search ................................... 375/340, 325, 375/324; 342/165, 360, 174

[56] References Cited

U.S. PATENT DOCUMENTS

| | | | |
|---|---|---|---|
| 5,530,449 | 6/1996 | Wachs et al. | 342/174 |
| 5,559,519 | 9/1996 | Fenner | 342/174 |
| 5,677,696 | 10/1997 | Silverstein et al. | 342/360 |

OTHER PUBLICATIONS

R.L. Pickholtz et al., "Theory of Spread–Spectrum Communications—A Tutorial", IEEE Transactions on Communication, vol. COM–30, No. 5, May 1982.

R.L. Pickholtz et al., "Revisions to Theory of Spread–Spectrum Communications—A Tutorial", IEEE Transactions on Communication, vol. COM–32, No. 2, Feb. 1984.

D.V. Sarwate et al., "Crosscorrelation Properties of Pseudorandom and Related Sequences", Proceedings of the IEEE, vol. 68, No.1 5, May 1980.

W.K. Pratt et al., "Hadamard Transform Image Coding", Proceedings of the IEEE 57, No. 1 (Jan. 1969), pp. 58–68.

*Primary Examiner*—Chi H. Pham
*Assistant Examiner*—Khai Tran
*Attorney, Agent, or Firm*—Marvin Snyder

[57] ABSTRACT

An architecture for remote calibration of coherent systems uses coherent reference and calibration signals that contain the relative amplitude and phase information desired in the calibration process. Circuitry extracts the relevant amplitude and phase information needed for the calibration while compensating for non-synchronized clocks and the effects of Doppler shifts due to relative motion of the transmitting and receiver platforms. The coherent detection architectures can be used effectively with any scheme designed to determine the relative amplitudes and phases of the signals emitted from the different elements of the phased array. These architectures are particularly applicable to coherent encoding calibration procedures that enhance the effective SNR by using coherent transmission of orthogonal transform encoded signals from N elements of the phased array. In an example calibration architecture, coherent elemental signals are encoded using controlled switching of the delay phase control circuits themselves to effectively generate a perfect orthogonal transform encoding of the signal vectors, even though the control circuits may be imperfect; no additional encoding hardware is required. The switching is dictated by matrix elements of an N xN invertible binary matrix, with the most preferred embodiment being an orthogonal binary matrix, i.e., a Hadamard matrix. The coherent signals are decoded with the inverse of the same binary matrix used in the control circuit encoding.

16 Claims, 5 Drawing Sheets

COHERENT DETECTION ARCHITECTURE FOR REMOTE CALIBRATION OF COHERENT SYSTEMS

BACKGROUND OF THE INVENTION

This invention relates to phased arrays in communications systems and, more particularly, to architectures for the coherent detection of the relative amplitude and phase of a calibration signal used in the remote calibration of an active transmitting and/or receiving phased array system.

A need exists for transmitting/receiving architectures that can be used in remote calibration of a phased array system to coherently detect relative amplitude and phase information while compensating for phase shifts due to a combination of effects such as unsynchronized clocks on the remote and receiving site, and Doppler frequency shifts caused by relative motion of the transmitting and receiving platforms.

SUMMARY OF THE INVENTION

The invention is directed to an architecture which uses coherent reference and calibration signals that contain the relative amplitude and phase information desired in the calibration process. These architectures provide the appropriate circuitry to extract this information needed for the calibration process while compensating for non-synchronized clocks and the effects of Doppler shifts due to relative motion of the transmitting and receiver platforms. These detection architectures are effective for satellite based phased array systems which may include, for example, geostationary, medium, and low earth orbit communication satellites, and space based synthetic aperture radar reconnaissance satellites.

The coherent detection architectures of the invention can be used effectively with any process for determining relative amplitudes and phases of the signals emitted from the different elements of the phased array. These architectures are particularly applicable to coherent encoding calibration procedures that enhance the effective SNR (signal-to-noise ratio) by using coherent transmission of orthogonal transform encoded signals from N elements of the phased array. In an example of such calibration architecture, coherent elemental signals are encoded using controlled switching of the delay phase control circuits themselves to effectively generate a perfect orthogonal transform encoding of the signal vectors, even though the control circuits may be imperfect. No additional encoding hardware is required. The switching is dictated by matrix elements of an N xN invertible binary matrix, with the most preferred embodiment being an orthogonal binary matrix, i.e., a Hadamard matrix. The coherent signals are decoded with the inverse of the same binary matrix used in the control circuit encoding.

The transmit subsystems derive multiple signals (calibration and reference) that are phase-locked to a common oscillator with a defined frequency and phase. This can be done either by frequency multipliers (multiplying phase-locked-loops) or by a combination of frequency multipliers and mixers (heterodyning phase-locked sources). All the receive subsystems derive a signal locked in frequency and phase to the uncoded calibration signal (without the extra amplitude and phase shift). The calibration signal is synchronously demodulated with the derived signal to get the relative coded amplitude and phase. In the two signal embodiment, a local oscillator is driven either to compensate entirely for the Doppler shift and oscillator phase or to come sufficiently close to full compensation to enable compensation to be completed digitally.

In an alternative embodiment of the invention, three coherent signals are used, two of which are reference signals and the third of which is the calibration signal that contains the relative amplitude and phase information desired in the calibration process. This architecture also provides appropriate circuitry to extract the relevant amplitude and phase information needed for the calibration while compensating for non-synchronized clocks and the effects of Doppler shifts due to relative motion of the transmitting and receiver platforms. This is done using higher order products of the signals to compensate for the Doppler shift and oscillator phase.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
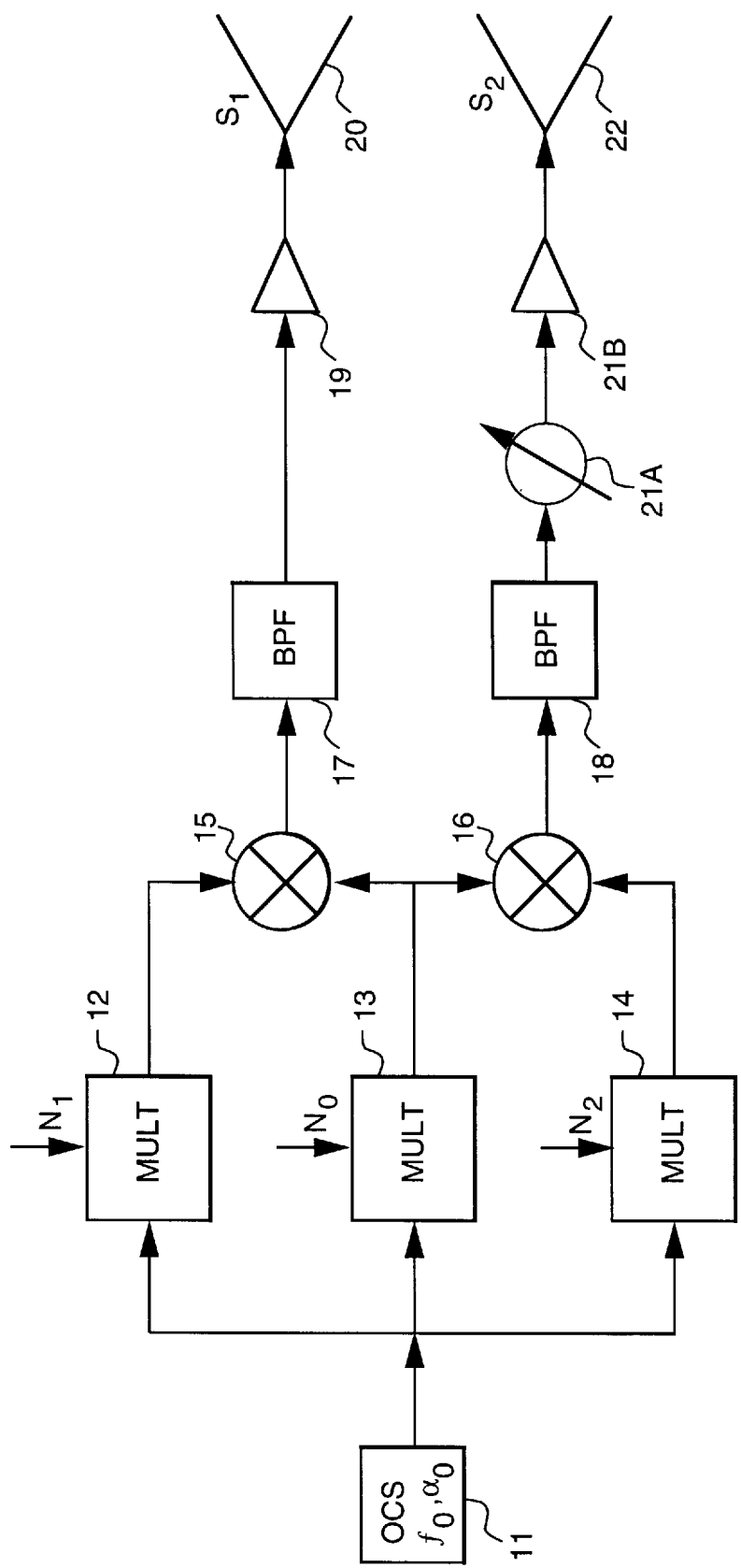
FIG. 1 is a block diagram of the transmission circuit according to a first embodiment of the invention.

FIG. 1 illustrates the specific case wherein the system reference signals and system calibration signals are emitted from different individual horns. In general, the calibration signals are emitted from all the elements of the phased array. The reference signal can have its own horn or it be emitted from a subset or the complete set of the array elements. The reference signals must be constant throughout the calibration process and therefore must bypass the phase shifters used to encode the elements.

A signal of frequency, phase $f_0, \alpha_0$ generated by an onboard satellite master oscillator 11 is multiplied in frequency multipliers 12, 13 and 14 to generate signals at frequency, phase $N_1 f_0, N_1 \alpha_0, N_0 f_0, N_0 \alpha_0, N_2 f_0, N_2 \alpha_0$, respectively. The signal $N_0 f_0, N_0 \alpha_0$ from multiplier 13 is respectively mixed in mixers 15 and 16 with signals $N_1 f_0, N_1 \alpha_0$ and $N_2 f_0, N_2 \alpha_0$ and bandpass filtered by filters 17 and 18 to produce the system reference signal $S_1$ and the system calibration signal $S_2$. The reference signal $S_1$ is amplified by amplifier 19 and then applied to antenna element 20 which is part of the beam former. The phase and amplitude of the calibration signal $S_2$ are modified by the phase shifter 21A and amplifier 21B before being applied to antenna element 22 of the beam former. These signals have functional forms, $$S_1 = A_1 \cos([N_0 + N_1][2\pi f_0 t + \alpha_0]), \qquad (1)$$

$$S_2 = A_2 \cos([N_0 + N_2][2\pi f_0 t + \alpha_0] + \alpha_{cal}).$$

The calibration signal $S_2$ is emitted from all the many elements of a phased array, only one element of which is depicted in FIG. 1. The reference signal $S_1$ may be emitted from a separate horn antenna, or can be emitted from a subset or the complete set of array elements.

The radial component of the relative motion of the transmitter and receiver platforms causes a Doppler shift in the frequencies of the transmitted signals, while the coherent detection systems described herein are designed to compensate for constant Doppler shifts of the reference and calibration signals. To obtain accurate phase measurements, it is important that variations in the Doppler shifts due to changes in the radial component of the satellites orbital velocity can be neglected during the time "window", or interval, used in the coherent detection process. For calibration systems using the calibration subsystem architecture, the required integration times can be made short enough to satisy this quasi-stationary velocity/Doppler condition for both geostationary and non-geostationary low and medium earth orbit satellite systems.

The origin of the coordinate system is defined to be fixed at the receiver site. Here, $\vec{R}(t) = \vec{R}_0 + \vec{v} t$ is the coordinate of the moving phased array, with $\vec{R}_0$ representing the position of the transmitter at time t=0. The radial velocity component is $$v_r \stackrel{def}{=} \vec{v} \cdot \frac{\vec{R}_0}{R_0},$$

and the Doppler shifted frequency factor is $$D \stackrel{def}{=} \left(1 - \frac{v_r}{c}\right).$$

Here c is the speed of light in vacuum, $3 \times 10^8$ m/sec.

Figure 2:
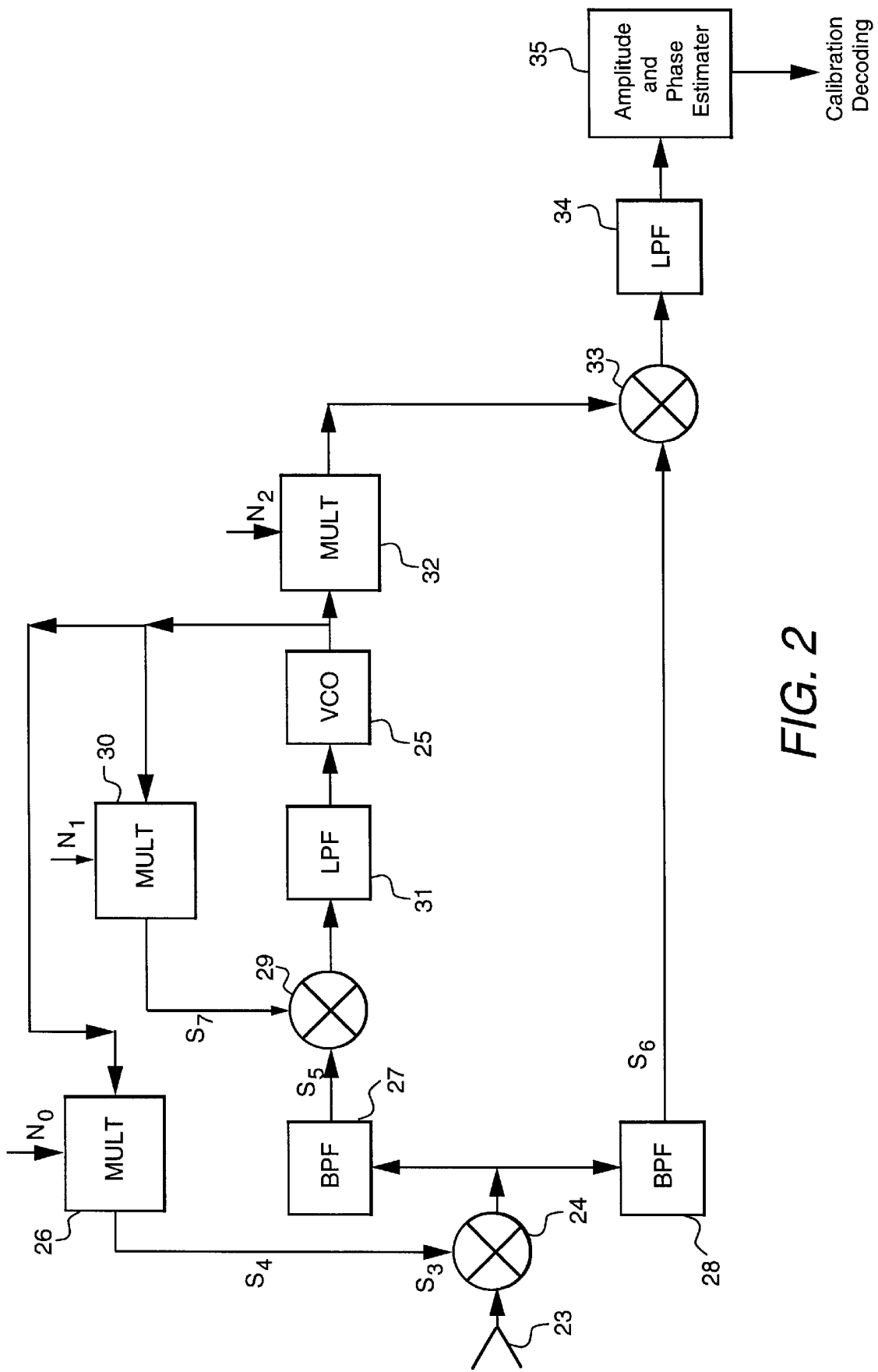
FIG. 2 is a block diagram of a first alternative for the analog receiver/phase decoder subsystem of the first embodiment.
Figure 3:
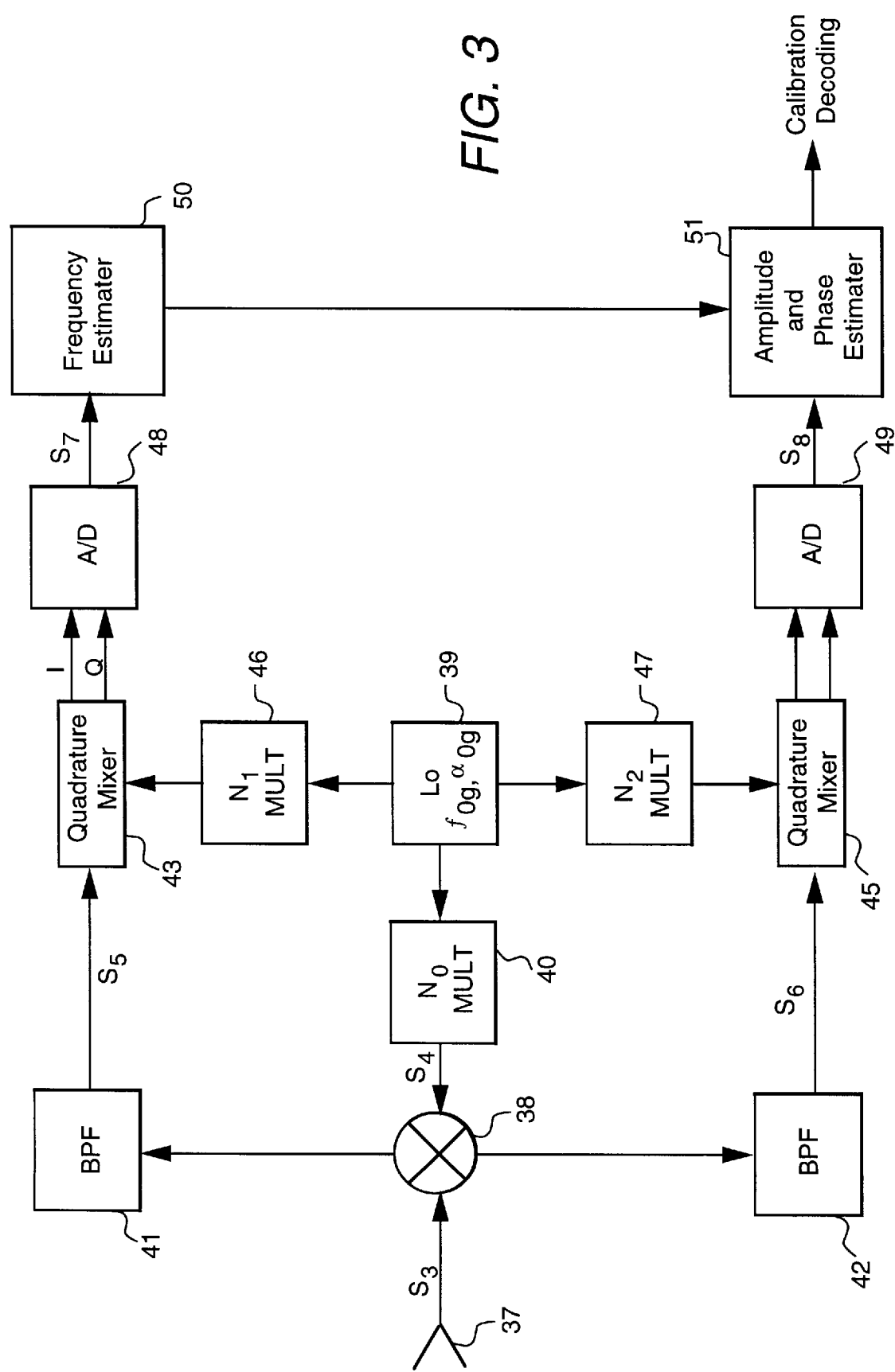
FIG. 3 is a block diagram of a second alternative for the analog receiver/phase decoder subsystem of the first embodiment.

The received Doppler-shifted signal at the receiver illustrated in FIGS. 2 and 3 is $S_3$, defined as $$S_3 = \sum_{n=1}^{2} B_n \cos(2\pi f_n t + \phi_n). \tag{2}$$

where $B_1$ and $B_2$ correspond, respectively, to $A_1$ and $A_2$ after transmission and reception of the signal; that is, $B_1$ and $B_2$ correspond to each of $A_1$ and $A_2$, respectively, multiplied by a scale factor.

Here $$f_1 = [N_o + N_1] f_o D, \tag{3}$$

$$\phi_1 = [N_0 + N_1]\left(-2\pi f_0 \frac{R_0}{c} + \alpha_0\right) + \alpha_{tr1}, \text{ and}$$

$$f_2 = [N_o + N_2] f_o D,$$

$$\phi_2 = [N_0 + N_2]\left(-2\pi f_0 \frac{R_0}{c} + \alpha_0\right) + \alpha_{tr2} + \alpha_{cal}.$$

The terms $\alpha_{tr1}$, $\alpha_{tr2}$ represent incremental phase delays due to a combination of factors including different path lengths and frequency dispersion of the refractive index along the propagation path. The frequencies $\{[N_0+N_1]f_0, [N_0+N_2]f_0\}$ are chosen to be close enough in value so the dispersion of the real and imaginary parts of the atmospheric dielectric constant over these frequency intervals is small enough to either be neglected, or represented as a linear function of the frequency separations $$\alpha_{tr2} \cong \alpha_{tr1} + \alpha_{path} + (N_2 - N_1) f_0 \delta. \tag{4}$$

The term $\alpha_{path}$ represents a possible constant phase difference due to a displacement of the transmitting horns for the calibration and reference signals.

In the receiver/phase decoder subsystem that is used to determine the different phases for the different calibration states and shown in FIG. 2, the received signal $S_3$ from antenna 23 is heterodyned in mixer 24 down to an intermediate frequency by mixing with a signal $$S_4 = B_4 \cos(N_0[2\pi f_{vco} t + \alpha_{vco}]), \tag{5}$$

generated from a receiver voltage-controlled oscillator (VCO) 25 and multiplier 26, and band-pass filtered by filters 27 and 28 producing the intermediate calibration signal $$S_5 = B_5 \cos(2\pi(f_1 - N_0 f_{vco}) t + \phi_1 - N_0 \alpha_{vco}), \tag{6A}$$

and intermediate reference signal $$S_6 = B_6 \cos(2\pi(f_2 - N_0 f_{vco}) t + \phi_2 - N_0 \alpha_{vco}). \tag{6B}$$

A mixer 29 mixes signal $S_5$ with a signal $$S_7 = B_7 \cos(N_1[2\pi f_{vco} t + \alpha_{vco}]). \tag{7}$$

generated by VCO 25 and a frequency multiplier 30. The output signal produced by mixer 29 is low-pass filtered by a filter 31, and then used to control VCO 25 which tunes the frequency and phase, $f_{vco}$, $\alpha_{vco}$, respectively, such that $$f_{VCO} = \frac{f_1}{N_0 + N_1} = f_0 D, \tag{8}$$

$$\alpha_{VCO} = \frac{1}{N_0 + N_1} \left[\phi_1 + \frac{\pi}{2}(2k+1)\right], k = 0, \pm 1, \pm 2, \ldots.$$

Signal $S_6$ is synchronously demodulated with the signal generated by VCO 25 and a multiplier 32 of frequency and phase $N_2 f_{vco}$, $N_2 \alpha_{vco}$, respectively, in a mixer 33 and low pass filter 34, producing the baseband direct current (DC) respective in-phase and quadrature phase (I, Q) signals, $$S_I = A \cos(\alpha_{cal} + const(\alpha_{tr2}, \alpha_{tr1})), \tag{9}$$

$$S_Q = A \sin(\alpha_{cal} + const(\alpha_{tr2}, \alpha_{tr1})).$$

Signals $S_I$ and $S_Q$ are supplied to an amplitude A and phase $\alpha_{cal}$ estimater 35, which produces the respective I and Q signal components, $$A = \sqrt{S_I^2 + S_Q^2}, \tag{10}$$

and $$\alpha_{cal} = -const(\alpha_{tr2}, \alpha_{tr1}) + \tan^{-1} \frac{S_Q}{S_I}.$$

The different calibration phases are determined relative to a phase offset represented in the above equations by const $(\alpha_{tr2}, \alpha_{tr1})$. This phase offset cancels out of the estimates of the relevant relative phases, provided that the environmental variables $\alpha_{tr2}$, $\alpha_{tr1}$ are quasi-stationary over the integration time "window" or interval.

FIG. 3 is a block diagram of another embodiment of the analog receiver/phase decoder subsystem. In this embodiment, the received signal $S_3$ from antenna 37 is heterodyned in a mixer 38 with a signal $$S_4 = B_4 \cos(N_0[2\pi f_{o_g} t + \alpha_{o_g}]), \tag{11}$$

generated from a receiver local oscillator 39 and frequency multiplier 40. The frequency $f_{o_g}$ is chosen to be nominally the same as that of the non-synchronized master oscillator on the satellite. Even if the two oscillators were initially matched in frequency prior to launch, the operational frequencies would differ slightly due to different environmental conditions and random aging factors. The mixer output signal is bandpass filtered by filters 41 and 42, producing two signals $$S_5 = B_5 \cos(2\pi(f_1 - N_o f_{o_g})t + \phi_1 - N_o \alpha_{o_g}), \tag{12}$$

and $$S_6 = B_6 \cos(2\pi(f_2 - N_o f_{o_g})t + \phi_2 - N_o \alpha_{o_g}). \tag{13}$$

Signals $S_5$, $S_6$ are both separately quadrature mixed in respective mixers 43 and 45 with signals generated from local oscillator 39 and frequency multipliers 46 and 47, respectively. The resulting synchronously demodulated I,Q signals are sampled and digitized in respective analog-to-digital (A/D) converters 48 and 49. The complex samples represented by $\{S_7(n), S_8(n)\}$ are of the form $$S_7(n) = B_7 \exp[j2\pi(N_1 + N_0)(f_0 D - f_{0_g})nT + \phi_1 - (N_1 + N_0)\alpha_{o_g}], \tag{13}$$

$$S_8(n) = B_8 \exp[j2\pi(N_2 + N_0)(f_0 D - f_{0_g})nT + \phi_2 - (N_2 + N_0)\alpha_{o_g}].$$

For a geostationary satellite system the magnitude of the radial velocity is less than approximately 1 m/sec, hence $$\left| \frac{v_r}{c} \right|$$

is less than approximately $3 \cdot 10^{-9}$. For a satellite operating in the Ku band, $(N_1 + N_0) f_0 D$ is approximately 12 GHz. Assuming the master oscillators on the satellite and the ground station are nominally matched in frequency, the operational difference between the two oscillator frequencies can be assumed to be less than approximately $5 \times 10^{-6} f_0$ due to random drift and different thermal environments. This means that the frequencies in signals $\{S_7(n), S_8(n)\}$ are less than 100 KHz apart. To have a margin of safety, the A/D converter sampling rates should be approximately 200 KHz.

Assuming the coherence times due to changes in the propagation environmental variables are long compared to the overall calibration time, the phase of signal samples $\{S_7(n)\}$ can be treated as being constant throughout the calibration process. Accurate estimates of the frequency $(N_1 + N_0)(f_0 D - f_{0_g})$ in turn result in an accurate estimate of $(f_0 D - F_{0_g})$, as the integers $N_1, N_2, N_0$ are all known.

A frequency estimator 50 responsive to the output signal of A/D converter 48 performs frequency estimation using any of the digital signal processing spectral estimation techniques that are well know in the art, such as the classical periodogram method, the autoregressive techniques and the signal/noise subspace techniques such as the MUSIC and ESPRIT algorithms.

Using the frequency estimate from frequency estimator 50, the sampled signals $S_8(n)$ are digitally analyzed by an amplitude and phase estimator 51 to provide an estimate of the amplitude and phase for each transmission in the calibration process.

The different calibration phases are determined relative to a constant phase offset $$\Phi \stackrel{def}{=} [N_0 + N_2] \left[ \alpha_0 - \alpha_{0_g} - 2\pi f_0 \frac{R_0}{c} \right] + \alpha_{tr2}. \tag{14}$$

Defining the I, Q components in terms of the real and imaginary parts of the signal, $$S_{8I}(n) = \Re\{S_8(n)\}, \tag{15}$$

and $$S_{8Q}(n) = \Im\{S_8(n)\}.$$

The estimated amplitude and phase are given, respecively, by, $$\hat{B}_8 = \frac{1}{M} \sum_{n=1}^{M} \left\{ \sqrt{(S_{8I}(n))^2 + (S_{8Q}(n))^2} \right\}, \text{ and} \tag{16}$$

$$\begin{aligned}
\hat{\alpha}_{cal} + \Phi &= \frac{1}{M} \sum_{n=1}^{M} \left\{ \tan^{-1} \frac{S_{8Q}(n)}{S_{8I}(n)} - [N_0 + N_2] 2\pi <f_0 D - f_{0_g}>_{est} nT \right\}, \\
&= \frac{1}{M} \sum_{n=1}^{M} \left\{ \tan^{-1} \frac{S_{8Q}(n)}{S_{8I}(n)} \right\} - \\
&\quad [N_0 + N_2] 2\pi <f_0 D - f_{0_g}>_{est} T \frac{(M+1)}{2}.
\end{aligned}$$

As an example, each coherent calibration step requires $N_{tr}$ transmissions and an overall integration time of $N_{tr}(\tau + MT)$, commensurate with the effective SNR of the parameter to be estimated. Here $\tau$ represents the signal transient interval during which the phases are changed on the calibration signal. The phase error for the parameter estimate is $$\epsilon_\alpha = [N_0 + N_2] 2\pi [f_0 D - f_{0_g} - <f_0 D - f_{0_g}>_{est}] N_{tr} \left( \tau + \frac{(M+1)T}{2} \right). \tag{17}$$

If $[N_2 + N_0]$ is assumed to be approximately $10^4$, and $f_0$ is assumed to be approximately 1 MHZ, then for the phase errors to be less than ½ of the quantization step for a five bit phase shifter $$\frac{2\pi}{2(2^5)} = \frac{2\pi}{64},$$

the integration times must be less than $$N_{tr}(\tau + MT) \leq \frac{1}{64} \frac{1}{[N_2 + N_0][f_0 D - f_{0_g} - <f_0 D - f_{0_g}>_{est}]}. \tag{18}$$

For the geosynchronous systems under consideration, the integration times required for typical effective SNRs are $N_{tr}(T + MT) \sim 100$ msec. This implies that the error in the frequency estimate is $$\epsilon_f \stackrel{def}{=} [N_0 + N_1][f_0 D - f_{0_g} - <f_0 D - f_{0_g}>_{est}] < \tag{19}$$

$$\frac{1}{64} \left[ N_{0_N} \frac{1}{[N_0 + N_2]} \right] \frac{1}{N_{tr}(\tau + MT)} \sim 0.16.$$

These accuracy criteria are readily satisfied.

The system of FIG. 3 has been reduced to practice via computer simulation. Results of statistical simulations for the frequency estimates show that they satisfy the accuracy criterion of equation (19). The simulations were carried out using a periodogram estimate as mentioned above. The parameters chosen were:

SNR=20dB
sampling rate=200 KHz
$f_1$=151.134 KHz
$f_2$=163.134 KHz

The periodogram was computed using a Fast Fourier Transform (FFT) of a coherent data samples of 2.6214 sec time length ($2^{19}$ samples). The estimated frequencies were obtained from a "center of mass" interpolation of the energy of maximum frequency samples of the resulting power spectra with the energy of the two adjacent samples on either side of the maximum. A statistical analysis for a Monte Carlo calculation results in mean and standard deviations for the estimated error for the two frequencies as:

mean$\{\hat{\epsilon}_{f_1}\}$=0.07713; std$\{\hat{\epsilon}_{f_1}\}$=2×10$^{-5}$; and
mean$\{\hat{\epsilon}_{f_2}\}$=0.002684; std$\{\hat{\epsilon}_{f_2}\}$=10$^{-6}$.

Figure 4:
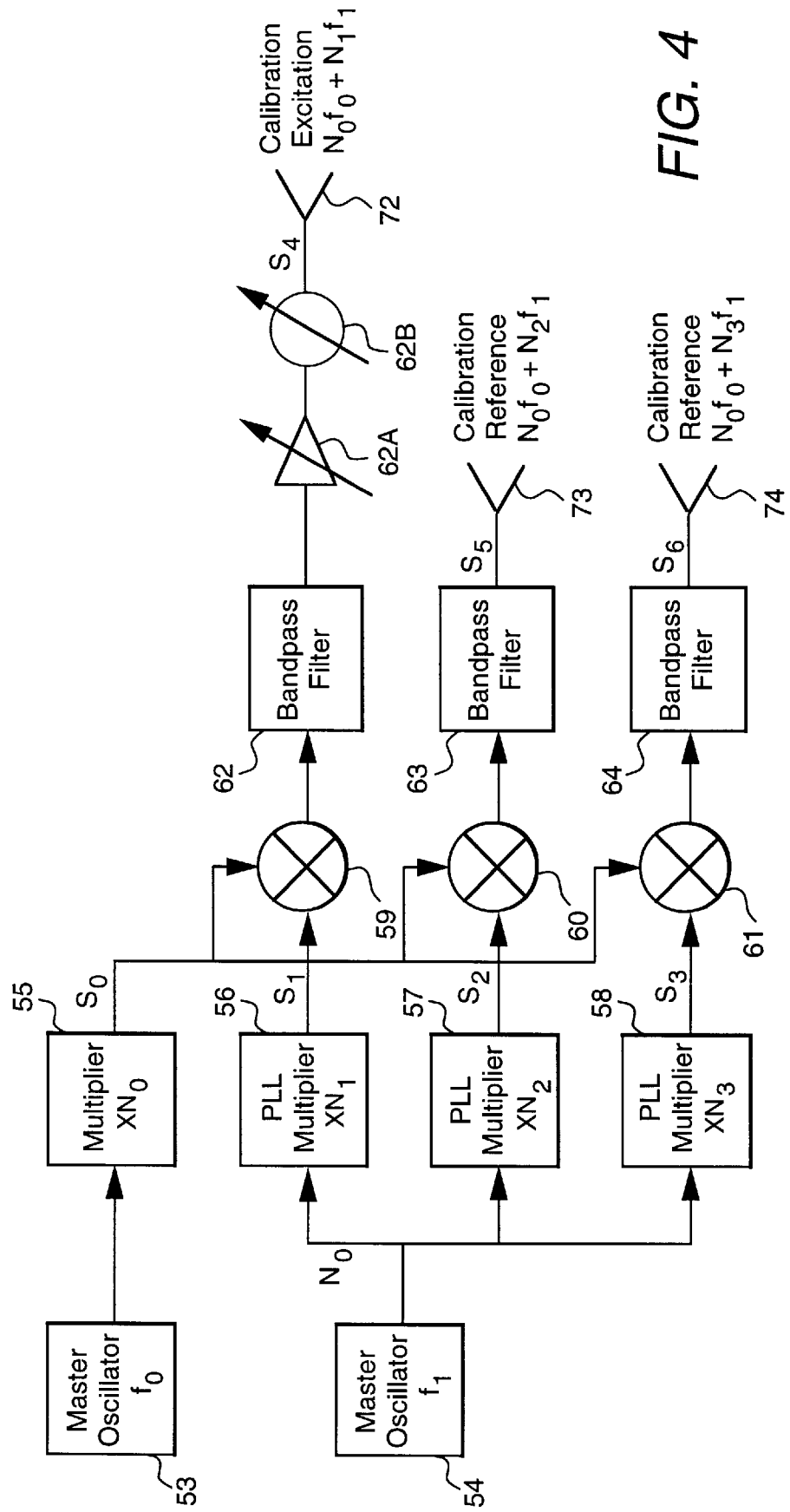
FIG. 4 is a block diagram of the transmission circuit according to a second embodiment of the invention.

In a second embodiment, of the invention, shown in FIG. 4, the transmission circuit uses three coherent signals, two of which are reference signals while the third is the calibration signal that contains the relative amplitude and phase information desired in the calibration process. Signals generated by a master oscillator 53 and operating at a frequency $f_0$ are put through a frequency multiplier circuit 55, while signals generated by a separate master oscillator 54 and operating at a frequency $f_1$ are put through frequency multiplier circuits 56, 57 and 58, thereby generating the four signals $S_0$, $S_1$, $S_2$, $S_3$ as illustrated in FIG. 4. The functional forms of these signals are $$S_0 = A_0\cos(2\pi N_0 f_0 t + N_0\alpha_0), \quad (20)$$

$$S_1 = A_1\cos(2\pi N_1 f_1 t + N_1\alpha_1),$$

$$S_2 = A_2\cos(2\pi N_2 f_1 t + N_2\alpha_1),$$

$$S_3 = A_3\cos(2\pi N_3 f_1 t + N_3\alpha_1).$$

Here $\alpha_0, \alpha_1$ are the offset phases associated with master oscillators 53 and 54, respectively. The frequency multipliers must be chosen to satisfy the condition $2N_2=N_1+N_3$ in order to cancel out the effects of non-synchronized clocks and Doppler phase shifts.

Signals $S_1$, $S_2$, $S_3$ are separately mixed in respective mixers 59, 60 and 61 with signal $S_0$ and are bandpass filtered by filters 62, 63 and 64, respectively, to produce the calibration signal $S_4$ and the two reference signals $S_5$ and $S_6$, respectively. The calibration signal is passed through the beam forming circuit where its amplitude and phase are scaled by an amplifier 62A and a phase shifter 62B according to the parameters of the beam forming circuit, and is emitted from an antenna 72. The reference signals $S_5$ and $S_6$ are emitted by antennas 73 and 74, respectively. The functional forms of these signals are given by, $$S_4 = A_4\cos(2\pi(N_0 f_0 + N_1 f_1)t + N_0\alpha_0 + N_1\alpha_1 + \alpha_{cal}), \quad (21)$$

$$S_5 = A_5\cos(2\pi(N_0 f_0 + N_2 f_1)t + N_0\alpha_0 + N_2\alpha_1), \text{ and}$$

$$S_6 = A_6\cos(2\pi(N_0 f_0 + N_3 f_1)t + N_0\alpha_0 + N_3\alpha_1).$$

Here $\alpha_{cal}$ represents the phase offset caused by the particular state of the beam forming circuitry, which is one of the parameters that has to be determined in the calibration procedure. It is important that any Doppler shifts due to relative motion of the transmission and receiver platforms be quasi-stationary throughout the coherent detection process. This quasi-stationary condition is readily satisfied for geostationary and non-stationary lower orbit satellite systems.

As previously noted, the origin of the coordinate system is defined to be fixed at the receiver site and $\vec{R}(t)=\vec{R}+\vec{v}t$ is the coordinate of the moving phased array, with R representing the position of the transmitter at time t=0. The radial velocity component is $$v_r \stackrel{def}{=} \vec{v} \cdot \frac{\vec{R}}{R},$$

and the Doppler-shifted frequency factor is $$D \stackrel{def}{=} \left(1 - \frac{v_r}{c}\right).$$

Figure 5:
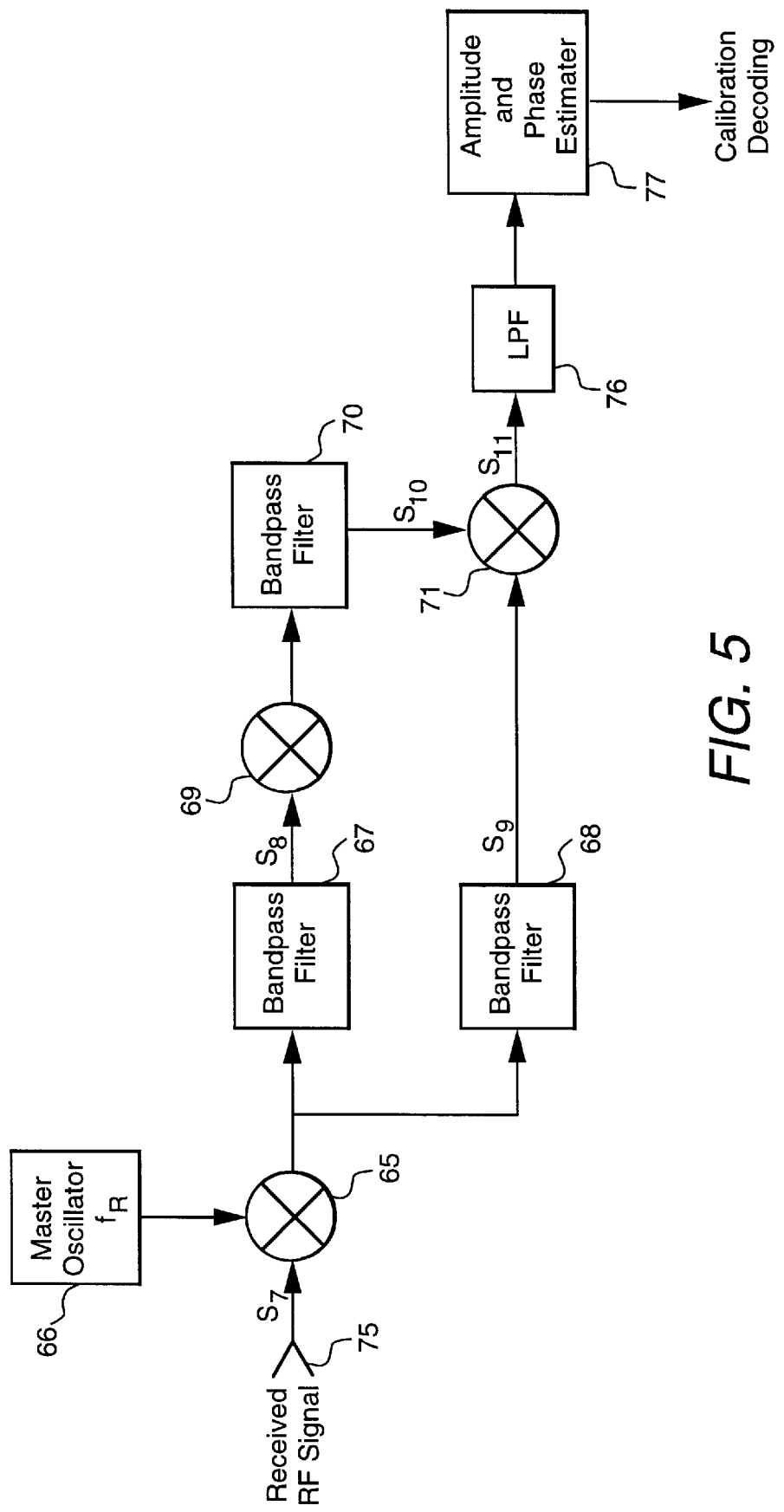
FIG. 5 is a block diagram of the receiver/phase decoder according to the second embodiment of the invention.

At receiving antenna 75, shown in FIG. 5, the received Doppler-shifted signal is, $$S_7 = \sum_{n+1}^{3} A_{7_n}\cos(2\pi f_{7_n} t + \phi_{7_n}). \quad (22)$$

Here $$f_{7_1} = (N_0 f_0 + N_1 f_1)D, \text{ and} \quad (23)$$

$$\phi_{7_1} = -2\pi f_{7_1}\frac{R}{Dc} + N_0\alpha_0 + N_1\alpha_1 + \alpha_{cal} + \alpha_{tr1},$$

$$f_{7_2} = (N_0 f_0 + N_2 f_1)D, \text{ and}$$

$$\phi_{7_2} = -2\pi f_{7_2}\frac{R}{Dc} + N_0\alpha_0 + N_2\alpha_1 = \alpha_{tr2},$$

$$f_{7_3} = (N_0 f_0 N_3 + f_1)D, \text{ and}$$

$$\phi_{7_3} = -2\pi f_{7_3}\frac{R}{Dc} + N_0\alpha_0 + N_3\alpha_1 + \alpha_{tr3}.$$

The frequencies, $\{f_{7_x}\}$, are chosen to be close enough in value so that dispersion of the real and imaginary parts of the atmospheric dielectric constant over this frequency interval is small enough to be either neglected or represented as a linear function of the frequency separations $$\alpha_{tr2} \cong \alpha_{tr1} + (N_2 - N_1)Df_1\delta, \text{ and} \quad (24)$$

$$\alpha_{tr3} \cong \alpha_{tr1} + (N_3 - N_1)Df_1\delta.$$

The received signal $S_7$ is heterodyned in mixer 65 with a signal of frequency and phase ($f_r, \phi_r$) from the receive master oscillator 66 and bandpass filtered by filters 67 and 68, producing intermediate frequency signals. Signals $S_8$ and $S_9$ from filters 67 and 68, respectively, are $$S_8 = \sum_{n=2}^{3} A_{8_n}\cos(2\pi(f_{7_n} - f_r)t + \phi_{7_n} - \phi_r), \text{ and} \quad (25)$$

$$S_9 = A_9\cos(2\pi(f_{7_1} - f_r)t + \phi_{7_1} - \phi_r).$$

Higher order powers of signal $S_8$ are generated in a mixer 69 and are filtered by a bandpass filter 70 to produce the signal $$S_{10}=A_{10}\cos(2\pi(2f_{7_2}-f_{7_3}-f_r)t+2\phi_{7_2}-\phi_{7_3}-\phi_r). \quad (26)$$

Signals $S_{10}$ and $S_9$ are synchrononously demodulated by being mixed in mixer 71 and are low-pass filtered by a filter 76 to produce baseband I and Q signals with frequencies and phases $$f_{11} = (N_3 + N_1 - 2N_2)Df_1, \text{ and} \quad (27)$$

$$\phi_{11} = (N_3 + N_1 - 2N_2)\left(2\pi\frac{R}{c} + \alpha_1 + Df_1\delta\right) + \alpha_{cal}.$$

By specifically choosing the calibration and reference frequencies such that $2N_2=N_1+N_3$, all the effects of the relative motion and non-synchronization of the clocks cancel out. Accordingly, the baseband I, Q signals are of the form $$S_{I11}=A_{11}\cos(\alpha_{cal}),$$

$$S_{Q11} = A_{11} \sin(\alpha_{cal}). \qquad (28)$$

In an amplitude and phase estimater 77, the relative amplitudes and phases are determined from the standard relations for the I and Q signal components $$A_{11} = \sqrt{S_{I11}^2 + S_{Q11}^2}, \qquad (29)$$

$$\alpha_{cal} = \tan^{-1} \frac{S_{Q11}}{S_{I11}}.$$

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by letters patent is as follows:

1. A coherent architecture for remotely calibrating a coherent system with a system reference signal and a system calibration signal, comprising:

local oscillator means for generating a signal having a defined frequency and phase;

a first frequency multiplier for generating an up conversion signal having a rational ($N_0$) frequency and phase relation with the local oscillator signal;

a second frequency multiplier for generating a baseband reference signal having a rational ($N_1$) frequency and phase relation with the local oscillator signal;

a third frequency multiplier for generating a baseband calibration signal having a rational ($N_2$) frequency and phase relation with the local oscillator, first up conversion means for accepting the up conversion signal and the baseband reference signal to produce the system reference signal;

second up conversion means for accepting the up conversion signal and the baseband calibration signal to produce the system calibration signal;

a first antenna for transmitting the system reference signal to a remote receiver;

a second antenna for transmitting the system calibration signal to the remote receiver, a third antenna for receiving said system reference and system calibration signals at a remote receiver, a voltage controlled oscillator for generating a signal having a defined frequency and phase dependent on a voltage controlled oscillator control signal;

a fourth frequency multiplier for generating a first down conversion signal having a rational ($N_0$) frequency and phase relation with the voltage controlled oscillator;

a fifth frequency multiplier for generating a second down conversion signal having a rational ($N_1$) frequency and phase relation with the voltage controlled oscillator;

a sixth frequency multiplier for generating a third down conversion signal having a rational ($N_2$) frequency and phase relation with the voltage controlled oscillator;

a first down conversion means for accepting the first down conversion signal and the received system reference and system calibration signals to produce intermediate reference and calibration signals;

a first bandpass filter for filtering the intermediate reference and calibration signals to produce a baseband reference signal;

a second bandpass filter for filtering the intermediate reference and calibration signals to produce a baseband calibration signal;

second down conversion means for accepting the second down conversion signal and the baseband reference signal to produce the voltage controlled oscillator control signal;

a synchronous demodulator for heterodyning the third down conversion signal and the baseband calibration signal to produce in-phase and quadrature output signals; and estimating means for producing amplitude and phase estimates of the received system calibration signal for calibration decoding.

2. The coherent architecture for remotely calibrating a coherent system of claim 1 wherein:

said first up conversion means comprises a first mixer for heterodyning the up conversion signal with the baseband reference signal, and a first bandpass filter for filtering the output signal produced by the first mixer, said second up conversion means comprises a second mixer for heterodyning the up conversion signal with the baseband calibration signal, and a second bandpass filter for filtering the output signal produced by the second mixer;

said first down conversion means comprises a third mixer for heterodyning the first down conversion signal and the received system reference and system calibration signals; and said second down conversion means comprises a fourth mixer for heterodyning the second down conversion signal and the baseband reference signal.

3. The coherent architecture for remotely calibrating a coherent system of claim 1 wherein said second antenna comprises a phased array antenna.

4. The coherent architecture for remotely calibrating a coherent system of claim 3 wherein said first antenna comprises a portion of said phased array antenna.

5. The coherent architecture for remotely calibrating a coherent system of claim 3 wherein said first antenna comprises a separate horn antenna.

6. The coherent architecture for remotely calibrating a coherent system with a system reference signal and a system calibration signal, comprising:

local oscillator means for generating a signal having a defined frequency and phase;

a first frequency multiplier for generating an up conversion signal having a rational ($N_0$) frequency and phase relation with the local oscillator signal;

a second frequency multiplier for generating a baseband reference signal having a rational ($N_1$) frequency and phase relation with the local oscillator signal;

a third frequency multiplier for generating a baseband calibration signal having a rational ($N_2$) frequency and phase relation with the local oscillator, first up conversion means for accepting the up conversion signal and the baseband reference signal to produce the system reference signal;

second up conversion means for accepting the up conversion signal and the baseband calibration signal to produce the system calibration signal;

a first antenna for transmitting the system reference signal to a remote receiver, a second antenna for transmitting the system calibration signal to the remote receiver, a third antenna for receiving said system reference and system calibration signals at a remote receiver;

local oscillator means for generating a signal having a defined frequency and phase;

a fourth frequency multiplier for generating a first down conversion signal having a rational ($N_0$) frequency and phase relation with the local oscillator signal;

a fifth frequency multiplier for generating a second down conversion signal having a rational ($N_1$) frequency and phase relation with the local oscillator signal;

a sixth frequency multiplier for generating a third down conversion signal having a rational ($N_2$) frequency and phase relation with the local oscillator signal;

down conversion means for accepting the first down conversion signal and the received system reference and calibration signals to produce intermediate reference and calibration signals;

a first bandpass filter for filtering the intermediate reference and calibration signals to produce a baseband reference signal;

a second bandpass filter for filtering the intermediate reference and calibration signals to produce a baseband calibration signal;

a first synchronous demodulator for heterodyning the second down conversion signal with the intermediate reference signal to produce in-phase and quadrature reference signals;

a second synchronous demodulator for heterodyning the third down conversion signal with the baseband calibration signal to produce in-phase and quadrature calibration signals;

a first analog to digital converter for sampling the in-phase and quadrature reference signals;

a second analog to digital converter for sampling the in-phase and quadrature calibration signals;

a frequency estimater responsive to the sampled in-phase and quadrature reference signals;

an amplitude and phase estimater responsive to the sampled in-phase and quadrature calibration signals; and output means responsive to said first and second estimaters for producing amplitude and phase estimates of the received system calibration signal for calibration decoding.

7. The coherent architecture for remotely calibrating a coherent system of claim 6 wherein:

said first up conversion means comprises a first mixer for heterodyning the up conversion signal with the baseband reference signal, and a first bandpass filter for filtering the output signal produced by the first mixer;

said second up conversion means comprises a second mixer for heterodyning the up conversion signal with the baseband calibration signal, and a second bandpass filter for filtering the output signal produced by the second mixer, and said down conversion means comprises a third mixer for heterodyning the first down conversion signal and the received system reference and system calibration signals.

8. The coherent architecture for remotely calibrating a coherent system of claim 6 wherein said second antenna comprises a phased array antenna.

9. The coherent architecture for remotely calibrating a coherent system of claim 8 wherein said first antenna comprises a portion of said phased array antenna.

10. The coherent architecture for remotely calibrating a coherent system of claim 8 wherein said first antenna comprises a separate horn antenna.

11. A coherent architecture for remote calibration of coherent systems comprising:

a first local oscillator for generating a signal having a defined frequency and phase;

a second local oscillator for generating a signal having a defined frequency and phase;

a first frequency multiplier for generating an up conversion signal having a rational ($N_0$) frequency and phase relation with the second local oscillator signal;

a second frequency multiplier for generating a first baseband reference signal having a rational ($N_2$) frequency and phase relation with the first local oscillator signal;

a third frequency multiplier for generating a second baseband reference signal having a rational ($N_3$) frequency and phase relation with the first local oscillator signal;

a fourth frequency multiplier for generating a baseband calibration signal having a rational ($N_1$) frequency and phase relation with the first local oscillator signal, where $2N_2 = N_1 + N_3$.

first up conversion means for accepting the up conversion signal and the first baseband reference signal to produce a first system reference transmission signal;

second up conversion means for accepting the up conversion signal and the second baseband reference signal to produce a second system reference transmission signal;

third up conversion means for accepting the up conversion signal with the baseband calibration signal to produce a system calibration transmission signal;

a first antenna for transmitting the first system reference transmission signal to a remote receiver;

a second antenna for transmitting the second system reference transmission signal to the remote receiver, a third antenna for transmitting the system calibration transmission signal to the remote receiver;

a forth antenna for receiving system reference and system calibration signals at a remote receiver.

a third local oscillator for generating a down conversion signal having a defined frequency and phase;

down conversion means for accepting the down conversion signal and the received system reference and system calibration signals to produce intermediate reference and calibration signals;

a first bandpass filter for filtering the intermediate reference and calibration signals to produce third and fourth baseband reference signals;

a second bandpass filter for filtering the intermediate reference and calibration signals to produce a baseband calibration signal;

a mixer responsive to the third and fourth baseband reference signals for producing a harmonic signal with frequency and phase twice that of the fourth baseband reference signal minus that of the third baseband reference signal;

a synchronous demodulator for heterodyning the harmonic signal with the baseband calibration signal to produce in-phase and quadrature output signals; and estimation means responsive to said synchronous demodulator for producing amplitude and phase estimates of the received system calibration signal for calibration decoding.

12. The coherent architecture for remotely calibrating a coherent system of claim 11 including low pass filter means coupling said synchronous demodulator to said estimation means.

13. The coherent architecture for remotely calibrating a coherent system of claim 11 wherein:

said first up conversion means comprises a second mixer for heterodyning the up conversion signal with the first baseband reference signal, and a first bandpass filter for filtering the output signal produced by the second mixer, said second up conversion means comprises a third mixer for heterodyning the up conversion signal with the second baseband reference signal, and a second bandpass filter for filtering the output signal produced by the third mixer;

said third up conversion means comprises a fourth mixer for heterodyning the third up conversion signal and the baseband calibration signal; and said down conversion means comprises a fifth mixer for heterodyning the down conversion signal and the received system reference signal.

14. The coherent architecture for remotely calibrating a coherent system of claim 11 wherein said third antenna comprises a phased array antenna.

15. The coherent architecture for remotely calibrating a coherent system of claim 14 wherein at least one of said first and second antennas comprises a portion of said third antenna.

16. The coherent architecture for remotely calibrating a coherent system of claim 15 wherein said at least one of said first and second antennas comprises a separate horn antenna.

* * * * *